(12) United States Patent
Crawford

(10) Patent No.: US 8,262,173 B2
(45) Date of Patent: Sep. 11, 2012

(54) SYSTEM AND METHOD FOR REMOTELY RELEASING A PARKING BRAKE ON A DISABLED VEHICLE

(75) Inventor: Matthew Wayne Crawford, Manhattan, MT (US)

(73) Assignee: Towhaul Corporation, Bozeman, MT (US)

( * ) Notice: Subject to any disclaimer, the term of this patent is extended or adjusted under 35 U.S.C. 154(b) by 0 days.

(21) Appl. No.: 12/285,798

(22) Filed: Oct. 17, 2008

(65) Prior Publication Data
US 2009/0048752 A1    Feb. 19, 2009

Related U.S. Application Data

(63) Continuation of application No. 11/335,558, filed on Jan. 20, 2006, now Pat. No. 7,452,038.

(51) Int. Cl.
*B60R 25/08* (2006.01)
*B60T 17/16* (2006.01)

(52) U.S. Cl. .............. 303/7; 303/3; 303/15; 188/3 H; 188/170

(58) Field of Classification Search ............. 303/3, 7, 303/15, 20, 89, 22.4–22.6; 188/170, 112 R, 188/3 R, 3 H; 180/53.4; 280/421
See application file for complete search history.

(56) References Cited

U.S. PATENT DOCUMENTS

| | | | |
|---|---|---|---|
| 2,861,845 A | 11/1958 | Keehn | |
| 2,872,059 A | 2/1959 | Miller | |
| 3,241,888 A | 3/1966 | Ternent | |
| 3,305,277 A | 2/1967 | Pickles et al. | |
| 3,528,707 A | 9/1970 | Casey | |
| 3,618,983 A | 11/1971 | Forse | |
| 3,650,570 A * | 3/1972 | Meeks | 303/7 |
| 3,802,746 A | 4/1974 | Walser | |
| 3,912,334 A | 10/1975 | Schwerin et al. | |
| 4,049,324 A | 9/1977 | Cermak | |
| 4,119,355 A | 10/1978 | Kreitner | |
| 4,236,762 A | 12/1980 | Hawker | |
| 4,258,959 A | 3/1981 | Knight et al. | |
| 4,470,640 A | 9/1984 | Golan et al. | |
| 4,576,418 A | 3/1986 | Holzinger et al. | |
| 4,586,584 A | 5/1986 | Auman et al. | |
| 4,635,758 A * | 1/1987 | Beard, Jr. | 188/3 H |
| 4,697,852 A * | 10/1987 | Scholz | 303/7 |
| 4,756,390 A * | 7/1988 | Meadows | 188/3 H |
| 4,793,661 A | 12/1988 | Munro | |
| 4,813,518 A | 3/1989 | Akiyama et al. | |
| 5,031,729 A * | 7/1991 | Wittkop et al. | 188/3 H |
| 5,042,883 A * | 8/1991 | McCann et al. | 303/7 |
| 5,112,113 A | 5/1992 | Wagner et al. | |
| 5,238,298 A | 8/1993 | Wagner et al. | |
| 5,251,967 A | 10/1993 | Eberling | |

(Continued)

*Primary Examiner* — Bradley King
*Assistant Examiner* — Thomas Irvin
(74) *Attorney, Agent, or Firm* — Clark & Brody

(57) ABSTRACT

A system and method of remotely controlling the parking brake of a disabled vehicle to be towed by a towing vehicle includes using the hydraulic fluid of towing vehicle to control the parking brake operation of the disabled vehicle. The towing vehicle is equipped with a control valve and brake release manifold assembly. The brake release manifold assembly provides a source of hydraulic fluid of controlled pressure. The towing vehicle has means to connect the controlled pressure hydraulic fluid of the towing vehicle to the parking brake system. The towing vehicle also has means to control and monitor the flow of hydraulic fluid to the disabled vehicle in order to either release or apply the brakes when desired.

6 Claims, 2 Drawing Sheets

U.S. PATENT DOCUMENTS

| | | | |
|---|---|---|---|
| 5,435,586 A | 7/1995 | Smith | |
| 5,458,402 A | 10/1995 | Jeffery | |
| 5,465,813 A * | 11/1995 | Lichter | 188/3 H |
| 5,503,468 A * | 4/1996 | Saffran | 303/7 |
| 5,681,992 A | 10/1997 | Klein et al. | |
| 5,779,324 A | 7/1998 | Cords et al. | |
| 5,791,441 A | 8/1998 | Matos | |
| 5,823,637 A | 10/1998 | Blue | |
| 6,142,582 A | 11/2000 | Karlsson | |
| 6,152,544 A * | 11/2000 | Greaves, Jr. | 303/7 |
| 6,164,730 A | 12/2000 | Main | |
| 6,170,922 B1 * | 1/2001 | Vannorsdel et al. | 303/71 |
| 6,322,159 B1 | 11/2001 | Eberling | |
| 6,394,558 B2 | 5/2002 | Cords | |
| 6,477,836 B1 | 11/2002 | Bianchetta et al. | |
| 6,527,348 B2 | 3/2003 | Jensen | |
| 6,675,576 B2 | 1/2004 | Bigo et al. | |
| 6,715,590 B2 | 4/2004 | Tabor | |
| 6,758,536 B2 | 7/2004 | Jacob | |
| 6,955,406 B2 | 10/2005 | Blue | |
| 7,088,227 B2 | 8/2006 | Ward | |
| 7,661,692 B1 * | 2/2010 | Sink | 280/402 |
| 2002/0180257 A1 | 12/2002 | Gill et al. | |
| 2002/0195870 A1 * | 12/2002 | Brunson et al. | 303/7 |
| 2003/0052532 A1 | 3/2003 | Costello et al. | |
| 2004/0012249 A1 | 1/2004 | Koelzer | |
| 2004/0183364 A1 * | 9/2004 | Marsh et al. | 303/7 |
| 2007/0102996 A1 | 5/2007 | Kelly et al. | |

* cited by examiner

SYSTEM AND METHOD FOR REMOTELY RELEASING A PARKING BRAKE ON A DISABLED VEHICLE

CROSS-REFERENCE TO RELATED APPLICATION

This application is a continuation of U.S. application Ser. No. 11/335,558 filed Jan. 20, 2006 now U.S. Pat. No. 7,452,038.

TECHNICAL FIELD

The present invention is directed to a system and method for remotely releasing a parking brake on a disabled vehicle.

BACKGROUND ART

In the prior art, many haul trucks are equipped with spring applied-hydraulic released parking brakes. Some haul trucks are equipped with an emergency parking brake release system. Often times, the emergency parking brake release system will not release the parking brakes due to leakage past the seals in the parking brake chamber. Cold temperatures and worn brake components can create this leakage problem. Under these circumstances the emergency parking brake release system typically does not supply the volume of hydraulic oil/fluid to build the pressure required to seat the seals in the parking brake release chambers.

Other disabled haul trucks require that a temporary hydraulic power pack be installed to release the parking brakes during towing. This option does not allow control of the parking brakes or monitoring of the release status of the parking brakes. In the case of an emergency, during towing, the parking brakes can not be reapplied. If there were a break away, the disabled haul truck would be completely out of control with no brakes applied.

Thus, there is a need to provide improved systems for control of the parking brakes of disabled vehicles, particularly heavy duty haul trucks. The present invention overcomes the drawbacks noted above and provides a method and system that allows for remote control of the parking brake of a disabled vehicle from the towing vehicle in an efficient and effective manner.

SUMMARY OF THE INVENTION

It is a first object of the present invention to provide a method and system for remotely controlling the release of a parking brake on a disabled vehicle.

Another object of the present invention is a method and system that allows the control of parking brake systems for different kinds of disabled vehicles.

Other objects and advantages will be come apparent as a description of the invention proceeds.

The invention is an improvement in the field of towing disabled vehicles. The invention comprises both a system that allows a disabled vehicle to be safely towed and a method of towing such a vehicle. The method aspect of the invention involves releasing or applying a parking brake of a disabled vehicle using the towing vehicle. This is accomplished by providing a source of hydraulic fluid at the towing vehicle and supplying the source of hydraulic fluid to a parking brake system of the disabled vehicle. The pressure of the supplied hydraulic fluid is controlled at the towing vehicle so as to release the parking brake of the disabled vehicle. The pressure of the hydraulic fluid is monitored during the towing operation, including the pressurized hydraulic fluid generated by the towing vehicle and or the hydraulic fluid being supplied to the disabled vehicle that is being towed.

In a preferred embodiment, two levels of hydraulic fluid pressure are supplied by the towing vehicle to accommodate disabled vehicles with parking brakes systems that use different hydraulic pressures. Preferably, the towing vehicle supplies the hydraulic fluid at one pressure level and the fluid pressure is reduced to a desired level for use by the parking brake system of the disabled vehicle, with both levels of pressure being monitored.

The monitoring step can include displaying the sensed pressures of the hydraulic fluids so that an operator can react if there is a problem with supply of the hydraulic fluid. An alarm can also be provided that would trigger a signal such as sound, light, vibration or any combination thereof to alert the towing vehicle operator of a problem should the monitored pressure deviate from a target range of value.

The source of hydraulic fluid can be generated in any manner, but a preferred manner is to use an accumulated source of hydraulic fluid, with the pressure of the accumulated source being maintained within a desired range or at a desired value.

Another preference for the invention is to use a towing vehicle employing a gooseneck hitch for towing.

The invention also entails, in one embodiment, a system for releasing a parking brake of a disabled vehicle with a towing vehicle to facilitate towing. The system includes a source of hydraulic fluid provided from the towing truck and means for supplying the hydraulic fluid to a parking brake system of the disabled vehicle. Also provided are means for controlling and monitoring the supply of the hydraulic fluid to the disabled vehicle, the controlling and monitoring means located on the towing vehicle.

The means for supplying the source of hydraulic fluid can be any mechanism that would allow the hydraulic fluid supplied by the towing vehicle to be communicated to the parking brake system of the disabled vehicle, with a preferred way being the use of one or more hoses on the towing vehicle. Each hose would be adapted with the appropriate couplings or the like to connect to a parking brake system of the disabled vehicle for supply of the hydraulic fluid to the parking brake system.

While any system can be utilized to provide the necessary and controlled supply of hydraulic fluid at the towing vehicle, one preferred mode is the use of an accumulator, the accumulator being in communication with the source of hydraulic fluid and providing an accumulated supply of hydraulic fluid to the disabled vehicle that is controlled and monitored for towing of the disabled vehicle.

While any means can be employed to control the generation of the hydraulic fluid at the towing vehicle as well as control its flow to the disabled vehicle, a preferred arrangement as the means for controlling and monitoring comprises a control valve located on the towing vehicle, the control valve being adapted to supply hydraulic fluid via an output line based on a sensed pressure. An accumulator is employed and adapted to receive supplied hydraulic fluid from the output line of the control valve for supply to the disabled vehicle via an output line. A pressure switch is also provided that senses pressure in the output line to control the output of the control valve and a solenoid valve is provided that is adapted to control flow of hydraulic fluid from the output line of the control valve to the supplying means, preferably by the use of a return line to a hydraulic fluid tank on the towing vehicle. A pressure transducer monitors the pressure in the output line and pressure of hydraulic fluid to the supplying means and a display is located in the towing vehicle and is adapted to display the monitored pressures from the pressure transducers.

While the system could use the hydraulic fluid as generated by the towing vehicle, another mode uses the hydraulic fluid of the towing vehicle in a reduced pressure condition for the disabled vehicle. In a preferred mode, a pressure reducer in communication with an output of the accumulator is provided, with an output line of the pressure reducer in communication with the supplying means. While a single reduced pressure arrangement could be employed, a preferred mode is to use a plurality of pressure reducers, each having a respective pressure transducer, the plurality of pressure reducers adapted to provide a hydraulic fluid at different pressure levels to accommodate different types of parking brake systems.

The system can also include an alarm associated with each pressure transducer, the alarm adapted to signal an operator of the towing vehicle when pressure of hydraulic fluid supplied by the towing vehicle or hydraulic fluid supplied to the disabled vehicle varies from a target range or value.

The invention also combines the system for releasing the parking brake of a disabled vehicle with a towing vehicle having a hitch for towing of a disabled vehicle. Preferably, the towing vehicle is one that employs a gooseneck hitch, and more preferably a gooseneck hitch and grab hook assembly.

DETAILED DESCRIPTION OF THE PREFERRED EMBODIMENTS

The invention provides a significant improvement in the field of hauling disabled vehicles. That is, the invention provides a way to independently control the parking brakes of the disabled vehicle from a towing vehicle. This ability compliments a towing vehicle that is merely designed to tow a disabled vehicle. With the invention, the value of the towing vehicle is significantly enhanced since it can now not only haul the disabled vehicle but also control the parking brakes of the disabled vehicle in spite of any problems that may exist with the parking brake system.

More particularly, practicing the invention allows the operator of the towing vehicle to monitor the parking brake state of the disabled vehicle and either release or apply the parking brakes from the confines of the towing vehicle during towing. This yields a significant in terms of safety. For example, in the event of an emergency during towing, the towing vehicle operator could change the state of the parking brakes of the disabled vehicle from a released state to an operative or applied state. Another advantage of having the control of the parking brake system stem from the towing vehicle is that if the towed vehicle should break away from the towing vehicle such that the connection between the two vehicles would be severed, the loss of hydraulic fluid to the parking brake system would result in a reapplication of the parking brakes and stopping of the run away disabled vehicle.

Figure 1:
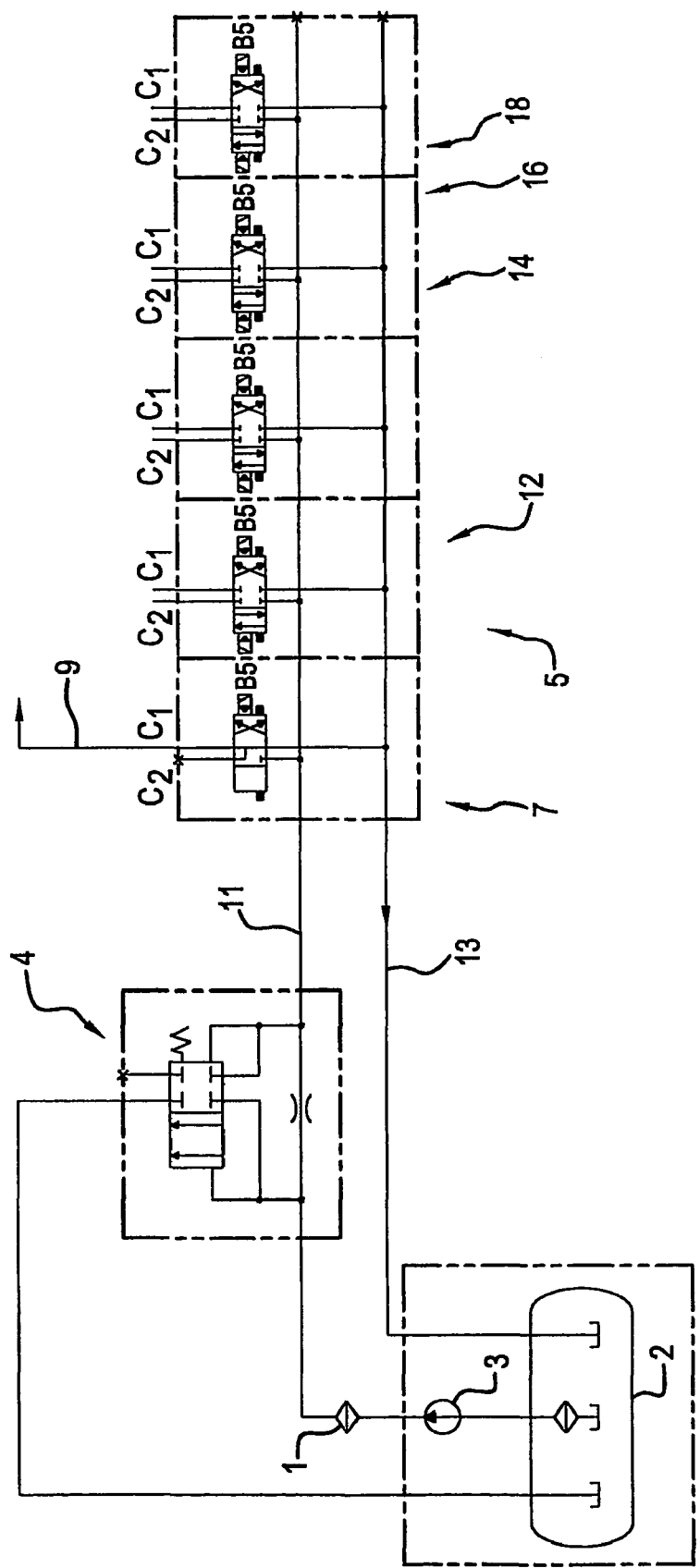
FIG. 1 is a schematic view of one aspect of the invention.
Figure 2:
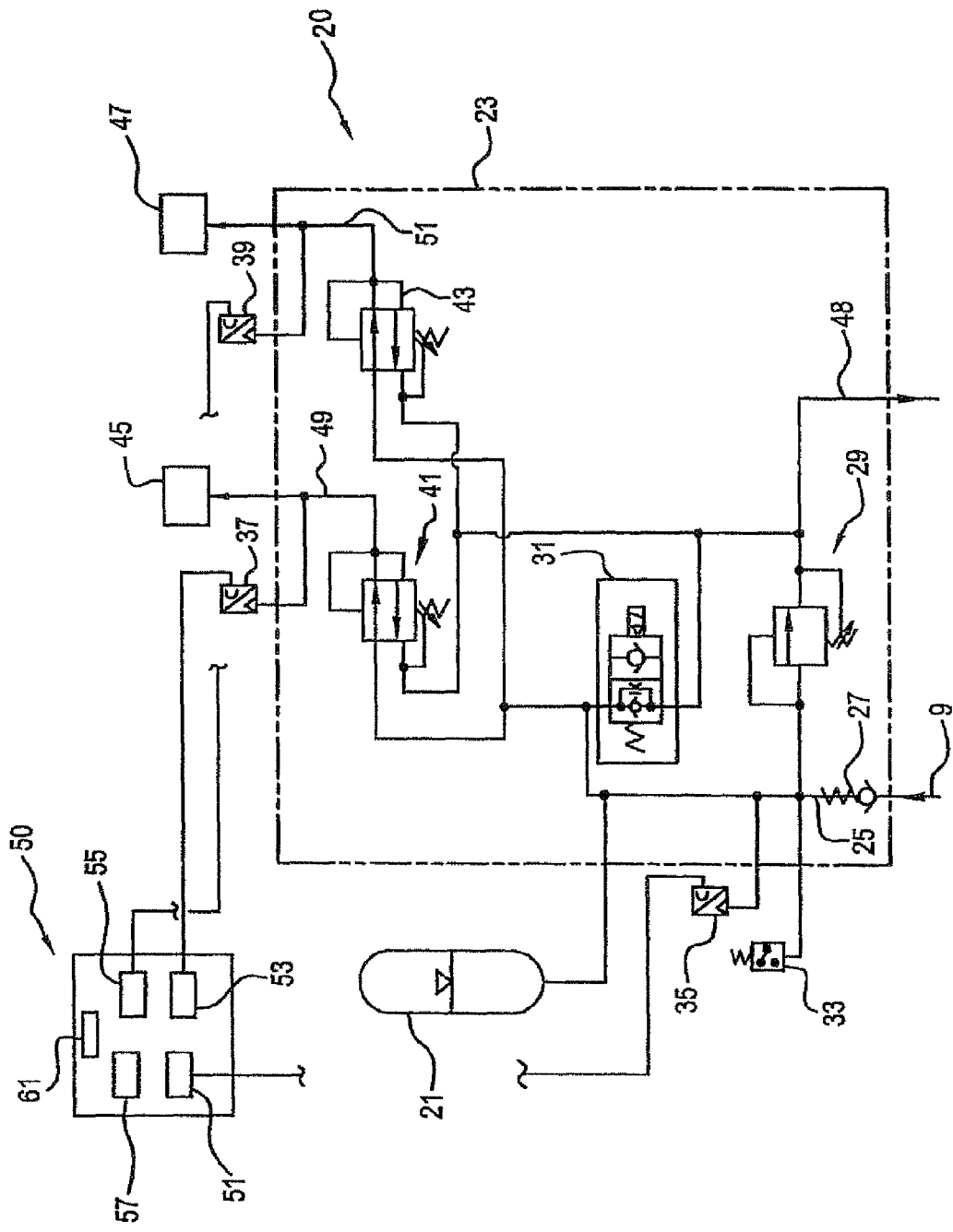
FIG. 2 is a schematic view of another aspect of the invention.

Referring now to FIGS. 1 and 2, the overall intent of the system and method of the invention is to remotely release the park brakes of a disabled vehicle such as a haul truck from a towing vehicle, and automatically maintain the release pressure and allow constant system monitoring from the towing vehicle.

FIG. 1 shows one embodiment of the invention, wherein components typically found on a towing vehicle are illustrated. In this embodiment, the towing vehicle is a modified haul truck. That is, the haul truck is modified by having its dump body and hoist cylinders removed, but still keeping the existing hydraulic hoist pump on the truck. Then, the haul truck is fitted with a towing package that makes use of the hydraulic hoist pump for its operation. One example of such a modified towing truck is one manufactured and sold by TowHaul Corporation of Bozeman Mont. The towing vehicle is a multiple use vehicle that can, in one mode, haul disabled vehicles using a gooseneck hitch. This vehicle is also equipped with a grab hook assembly on the gooseneck hitch that facilitates towing of low boy trailers. The towing package involving a gooseneck hitch that includes a grab hook assembly is shown in U.S. Pat. No. 5,435,586 to Smith, herein incorporated in its entirety by reference.

The towing package that is used in the modified haul truck is shown in FIG. 1. That is, a high pressure filter assembly 1 is situated downstream of the hydraulic hoist pump 3 of the haul truck. A flow control assembly 4 designed to control the flow of hydraulic fluid, e.g., between 55-60 gpm, is arranged downstream of the filter assembly 1. A control valve assembly 5 is utilized to control the flow of hydraulic fluid to the various components of the towing package added to the haul truck.

In the towing package employed in the haul truck of TowHaul Corporation, the control valve is a four section hydraulic control valve with input 11 and return 13 designed to operate two slide cylinders (section 12), two apron cylinders (section 14), one grab hook cylinder (section 16), and two or more low boy trailer cylinders (section 18). In the FIG. 1 embodiment of the invention, the existing hydraulic control valve assembly 5 is modified to include an additional section 7 with hydraulic fluid output 9 to provide hydraulic fluid to means for controlling and monitoring the supply of hydraulic fluid to the disabled vehicle.

FIG. 2 shows one embodiment of the controlling and monitoring means as system 20. The system 20 includes an accumulator 21, e.g., a five gallon type, and a brake release manifold assembly 23. The assembly 23 is shown with an input line 25 which communicates with the output 9 of the control valve section 7. A check valve 27 is provided at input 25 to prevent backflow to the control valve section 7. A relief valve 29 is also provided in communication with the input 25 to allow for bypass of hydraulic fluid back to the tank or reservoir 2 of the hydraulic hoist pump 3 if the pressure in line 25 should exceed a set limit. In one embodiment, this limit is preferably 2,200 psi, but this limit could vary depending on the pump 3 and parking brake system requirements of the disabled vehicles intended to be towed.

The manifold assembly 23 also includes a solenoid valve cartridge 31 (preferably two-position two-way), a pressure switch 33, three pressure transducers 35, 37, and 39, two pressure reducing cartridges 41 and 43, and means for supplying hydraulic fluid from the manifold assembly 23 to a disabled vehicle. As one example of this means, hoses on hose reels can be used, and these are shown schematically as 45 and 47. The manifold assembly also has a return line 48 which is in communication with the tank 2.

The manifold assembly 23 is adapted to provide hydraulic fluid at different pressures at outputs 49 and 51 to accommodate different disabled vehicles. One way used to accomplish this is the use of a pair of pressure reducing cartridges 41 and 43 and complementary hose reel assemblies 45 and 47 for connection to a desired disabled vehicle. In the mining industry, two types of haul trucks are predominant, one made by Caterpillar® and one made by Komatsu®. The Caterpillar truck normally operates at a hydraulic pressure of 600 psi whereas the Komatsu truck operates at a pressure of 1,500 psi. The manifold assembly 23 exemplified in FIG. 2 is designed with connecting or supplying means adapted for the two different hydraulic pressure requirements. For example, pressure reducer 41 would be designed to produce a target 600 psi pressure at output 49 with the pressure reducer 43 designed to produce a target 1,500 psi at output 51.

A control panel is shown schematically as 50, the control panel including digital displays 51, 53, and 55 and a switch or other means 57 for controlling the operation of the parking brakes on the disabled vehicle. In one embodiment, the switch 57 can be a rocker switch that moves between a RELEASE BRAKES position, wherein the parking brakes of the disabled vehicle are released or an APPLY BRAKES position, wherein the parking brakes of the disabled vehicle are applied.

The operation of the embodiment of the inventive system illustrated will now be described. Prior to the need for towing a vehicle, the control valve section 7 would not operate and no hydraulic fluid or electrical power would be available to the system 20. If the need should arise for the towing vehicle to haul a disabled vehicle, the appropriate hose 45 or 47 would be used and the coupling on the hose end (not shown) would be attached to the appropriate location on the disabled vehicle so that hydraulic fluid can be supplied to the parking brake system of the disabled vehicle.

With the appropriate hose connected to the disabled vehicle, the switch 57 would be set to the RELEASE BRAKES position. This shifts the solenoid cartridge 31 to close communication with the return line 48. With the movement of the switch, power is also applied to the components of the system 20 and the pressure switch 33 senses a low pressure in the input line 25 and sends a signal to control valve section 7 to supply hydraulic fluid to the system 20. This hydraulic fluid is supplied via output line 9 so as to charge the accumulator 21. The pressure switch 33 senses pressure of the hydraulic fluid so as to maintain a pressure of between 1,700 and 2,100 psi in the accumulator 21. When the pressure switch 33 senses that the pressure is at a desired level, e.g., 2,000 psi, it signals to control section valve section 7 to return to its neutral position and the flow of hydraulic fluid ceases, and the system 20 operates on accumulated pressure. The check valve 27 prevents loss of pressure back to the tank 2, and the relief valve cartridge 29 protects against overpressurization of the system 20. If the pressure in the system 20 should fall below a target pressure, the pressure switch 33 will sense such pressure loss and signal the control valve section 7 to open and provide additional hydraulic fluid to the system 20.

The stored and pressurized hydraulic fluid in the accumulator 21 provides hydraulic fluid to the pressure reducing cartridges 41 and 43, each set at different pressures as described above. The reduced pressure hydraulic fluid will flow from the output of a selected pressure reducing cartridge that is connected to the disabled vehicle so that the brakes can be released.

The system 20 also allows the operator of the towing vehicle to control and monitor the supply of hydraulic fluid to the disabled vehicle. The pressure transducer 35 monitors the hydraulic pressure to the accumulator 21 and sends a signal to its digital display 51 to alert the operator of the towing vehicle as to the level of pressure upstream of the pressure reducing cartridges 41 and 43. Similarly, each transducer 37 and 39 monitors the pressure downstream of their respective pressure reducing cartridges and each sends a signal to its digital display, 53 and 55, respectively to alert the operator of the pressure being supplied to the disabled vehicle. Each of the displays is designed to monitor the pressure within a target range and trigger an alarm 61, e.g., audio, visual vibratory, or a combination thereof. Typical pressure ranges would be 1,700-2,100 psi for display 51 and input line 25, 550-680 psi for output 49 for the Caterpillar truck and display 51, and 1,500 to 2,200 psi for output line 51 for the Komatsu truck and display 53. These ranges are exemplary and others could be employed depending on the particulars of the system 20 and the disabled vehicle to be towed. As a check on the alarm system, the alarm system can be designed to temporarily activate once the system initially becomes operational. Also and while three individual displays are shown, a single display or display/alarm combination could be employed that would receive signals from each transducer and be able to display the different pressures being monitored.

While a control and monitoring system and method are disclosed that takes a hydraulic fluid provided at a designated or controlled pressure by the towing vehicle and reduces it to a target pressure for the disabled vehicle, the control and monitoring system and method could do without the pressure reducers. For example, if the disabled vehicle had a parking brake system that used a hydraulic fluid pressure that matched that of the towing vehicle, the system could merely provide a hydraulic pressure from the towing vehicle directly to the disabled vehicle without the need for pressure reduction. In this embodiment, it may be necessary to regulate the pressure supplied by the accumulator within a particular range for the disabled vehicle, and the manifold assembly could employ such a regulator in place of the illustrated pressure reducers. In this mode, the control of the towing vehicle pressure and monitoring of the pressure of hydraulic fluid supplied by the towing vehicle and the hydraulic fluid supplied to the disabled vehicle would still be maintained using the appropriate pressure sensing devices.

During the towing operation, a malfunction or other problem could occur such that the alarm would be triggered. In such a situation, the operator should immediately stop the towing vehicle and investigate the reason for the variance in pressure and take the appropriate corrective measures.

If the operator should want to apply the parking brakes of the disabled vehicle, the switch 57 can be moved to the APPLY BRAKES position. This shifts the solenoid cartridge 31 to provide communication between the pressurized manifold assembly 23 and the return line 48 thereby releasing the pressure in the system. The movement of the switch 57 would also de-energize the system electrically.

The invention offers a number of advantages over current methods for controlling the parking brake of a disabled vehicle. First, the system automatically maintains the brake release pressure of the vehicle being towed. Multiple pressures can be accommodated using a single system. One switch that is readily accessible to the operator of the towing vehicle is used to either release the brakes or apply the brakes. Using the towing vehicle's hydraulic system greatly reduces the risk of a runaway disabled vehicle by a failure in the disabled vehicle's parking brake system. The monitoring of the brake release system minimizes the potential of towing a disabled vehicle with a partially applied parking brake.

It should also be understood that the TowHaul Corporation modified haul truck is one example of a towing vehicle that is capable of remotely controlling the parking brake operation of a disabled vehicle. However, other towing vehicle systems using different arrangements of hydraulic fluid supply and control could be employed to provide hydraulic fluid to a means for controlling and monitoring the supply of pressurized hydraulic fluid to the disabled vehicle. For example, another towing type of towing vehicle and towing package may require a different type of control valve for operation of the cylinders associated with the lifting arrangement. While the lifting arrangement of the towing vehicle may vary, the constant is the means associated with the towing vehicle to provide the supply of hydraulic fluid to the disabled vehicle's parking brake system so that the parking brake operation can be monitored and controlled from the towing vehicle.

While the brake release manifold is shown supplying two different levels of pressurized hydraulic fluid for two different types of towing vehicles, it should be understood that it could be made so that it supplies just one pressure level range of hydraulic fluid or more than two different levels.

Also and although the means for connecting the pressurized hydraulic fluid to the disabled vehicle is exemplified as a hose and hose reel with the appropriate couplings on the end of the hose for connection to the parking brake system of the disabled vehicle, other types of connection means as would be known in the art could be employed. Also, one hose and hose reel assembly could be used to connect to the disabled truck with the appropriate valving or diverters to connect the single hose to the appropriate one of pressure reducing cartridge pair.

In addition, the particular components of the brake release manifold could be altered providing that: (1) a source of hydraulic fluid is still supplied to the disabled vehicle; and (2) that the supplied hydraulic fluid flow can be controlled and monitored from the towing vehicle to allow the operator of the towing vehicle to be able to either release or apply the parking brakes or take other action when given input as to the operation of the brake release manifold system.

The disabled and towing vehicles can be any type of a vehicle. Preferably, the disabled vehicle is a mining haul truck and the towing vehicle is a truck designed to tow these heavy duty hauling trucks. As mentioned above, one example of a towing vehicle is one that employs a gooseneck hitch and grab hook assembly for towing both disabled vehicles and trailers, e.g., those manufactured by TowHaul Corporation of Bozeman, Mont.

As such, an invention has been disclosed in terms of preferred embodiments thereof which fulfills each and every one of the objects of the present invention as set forth above and provides a new and improved method and system for remotely controlling the parking brake of a disabled vehicle.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A system for releasing a spring applied parking brake of a disabled vehicle having a service braking system and a spring applied parking brake system with a towing vehicle to facilitate towing comprising:

a source of hydraulic fluid, the source of hydraulic fluid being provided in one or more elevated pressure levels at the towing vehicle;

means for supplying one of the one or more elevated pressure level hydraulic fluids to the spring applied parking brake system of the disabled vehicle;

means for controlling and monitoring the supply of the hydraulic fluid to the disabled vehicle, the controlling and monitoring means located on the towing vehicle so as to control the operation of the spring applied parking brake system on the disabled vehicle from the towing vehicle, wherein the ability of supplying the elevated pressure level hydraulic fluid to the disabled vehicle permitting towing of disabled vehicles with parking brakes systems using an elevated pressure parking brake system hydraulic pressure, wherein a single line between the towing vehicle and the towed vehicle is used for both supply and return of the selected hydraulic fluid applied to the spring applied parking brake system and the braking system of the towing vehicle including a parking brake and a service brake, and further wherein the means for controlling and monitoring the hydraulic fluid controls the operation of the spring applied parking brake system on the disabled vehicle from the towing vehicle independently of the braking system of the towing vehicle.

2. The system of claim 1, wherein the means for supplying the source of hydraulic fluid is one or more hoses on the towing vehicle, the hose adapted to connect to the spring applied parking brake system of the disabled vehicle for supply of the hydraulic fluid to the spring applied parking brake system.

3. The system of claim 1, wherein the controlling and monitoring means includes an accumulator, the accumulator in communication with the source of hydraulic fluid and providing the supply of hydraulic fluid to the disabled vehicle that is controlled and monitored for towing of the disabled vehicle.

4. In a towing vehicle having at least four tires, a braking system including a parking brake and a service brake, and a hitch for towing of a disabled vehicle, the improvement comprising the towing vehicle including a system for releasing a spring applied parking brake of a disabled vehicle with a towing vehicle to facilitate towing comprising:

a source of hydraulic fluid, the source of hydraulic fluid being provided in one or more elevated pressure levels at the towing vehicle;

means for supplying one of the one or more elevated pressure level hydraulic fluids to the spring applied parking brake system of the disabled vehicle;

means for controlling and monitoring the supply of the hydraulic fluid to the disabled vehicle, the controlling and monitoring means located on the towing vehicle so as to control the operation of the spring applied parking brake system on the disabled vehicle from the towing vehicle, wherein the ability of supplying the elevated pressure level hydraulic fluid to the disabled vehicle permitting towing of disabled vehicles with parking brakes systems using an elevated pressure parking brake system hydraulic pressure for controlling the parking brakes on the disabled vehicle, wherein the means for controlling and monitoring the supply of the hydraulic fluid and operating the spring applied parking brake controls the operation of the spring applied parking brake system on the disabled vehicle from the towing vehicle independently of the braking system of the towing vehicle.

5. The towing vehicle of claim 4 wherein the towing vehicle has a gooseneck hitch.

6. The towing vehicle of claim 5, wherein the gooseneck hitch includes a grab hook for latching to a low boy trailer.

* * * * *